United States Patent [19]

Dangler

[11] Patent Number: 4,755,876
[45] Date of Patent: Jul. 5, 1988

[54] IMAGE SCANNER

[75] Inventor: Paul E. Dangler, Rochester, N.Y.

[73] Assignee: Eastman Kodak Company, Rochester, N.Y.

[21] Appl. No.: 77,724

[22] Filed: Jul. 27, 1987

[51] Int. Cl.⁴ .............................................. H04N 3/06
[52] U.S. Cl. ..................... 358/264; 358/41; 358/50; 358/55; 358/75; 358/205; 358/213.28; 358/225; 358/294
[58] Field of Search ............... 358/205, 199, 264, 293, 358/294, 209, 212, 225, 213.28, 41, 50, 55, 75

[56] References Cited

U.S. PATENT DOCUMENTS

| | | | |
|---|---|---|---|
| 3,241,015 | 3/1966 | Allen | 318/18 |
| 3,655,954 | 4/1972 | Speth | 318/615 |
| 4,139,811 | 2/1979 | Klinger | 318/615 |
| 4,284,942 | 8/1981 | Bigley et al. | 318/618 |
| 4,333,112 | 6/1982 | Matsumoto | 358/293 |
| 4,507,594 | 3/1985 | Takemoto | 318/615 |
| 4,638,371 | 1/1987 | Milch | 358/293 |
| 4,695,722 | 9/1987 | Motooka | 358/293 |
| 4,714,830 | 12/1987 | Usui | 358/293 |

Primary Examiner—Howard W. Britton
Attorney, Agent, or Firm—Donald D. Schaper

[57] ABSTRACT

An image scanner is disclosed which utilizes a dither plate to steer an image onto a sparsely-populated image sensor in order to effectively fill in the gaps between photosites. A DC motor, which is responsive to a servo control, is used to precisely position the dither plate relative to the image sensor. In order to provide a scanner which can scan at a rate compatible with a high throughput, a low inertia, low inductance motor is used to position the dither plate. The position of a dither plate is sensed by a linear proximity sensor which is part of a closed-loop servo control for the motor.

12 Claims, 5 Drawing Sheets

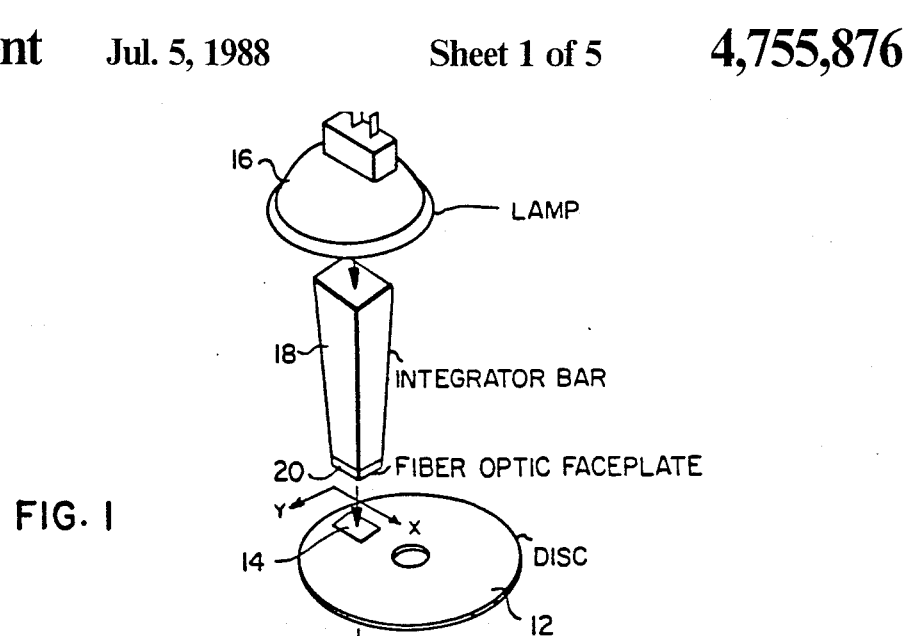
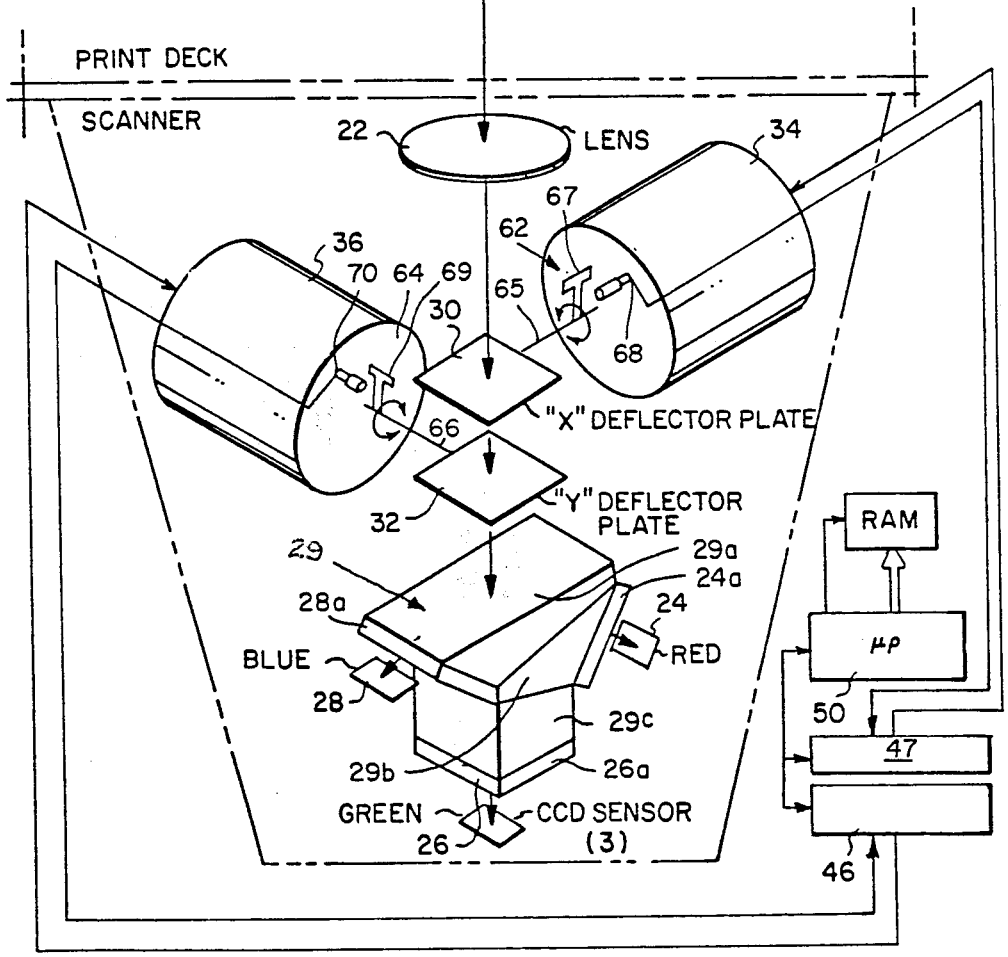
FIG. 1

IMAGE SCANNER

BACKGROUND OF THE INVENTION

1. Field of the Invention

The present invention relates to an image scanner, and more particularly, to a such a scanner in which dither plates are utilized to steer an image onto an image sensor.

2. State of the Prior Art

In image scanners which utilize solid-state image sensors, glass plates, known as dither plates, are used to move an image relative to the image sensors in order to fill in areas between individual sensors and thereby gain additional pixels of information. The plates are moved through a small angle to scan the image, and they must be precisely controlled both as to position and velocity.

Scanner dither plates have been driven by stepper motors. For example, in U.S. Pat. No. 4,638,371, an image scanner is disclosed in which two dither plates are moved in orthogonal directions by a pair of stepper motors. In driving a dither plate with a stepper motor, it is necessary to use a microstepping controller to achieve the small step size required in driving the plates. Such a controller adjusts the currents applied to the windings of the motor so as to position the rotor in increments which are smaller than the rated step size. A problem with this arrangement is that stepper motors have an undesirable tendency to overshoot, or even oscillate, at the end of a step. When used in a microstepping application, the amount of overshoot can be excessive. Attempts have been made to overcome this problem by the use of dampers or by customizing the command signal; however, such solutions have not been completely satisfactory.

SUMMARY OF THE INVENTION

It is an object of the present invention to overcome the problems in the prior art and to provide an image scanner in which dither plates can be precisely positioned relative to an image sensor in a high-throughput operation.

In accordance with one aspect of the present invention, there is provided an image scanner for scanning an image across the surface of an area image sensor having a plurality of spaced sensor elements, the scanner comprising: a generally planar plate arranged along an optical path and formed of a material for refracting light received along the path from an original; a motor attached to the plate for selectively rotating the plate about an axis to displace the image across the sensor surface and thereby cause each of the sensor elements to sense a plurality of image pixels; linear sensing means for sensing the position of the plate and for producing a signal indicative of the position; and control means for receiving said signal and for producing a drive signal to said motor.

In accordance with another aspect of the present invention, there is provided a motor control for an image scanner, the scanner having a dither plate for moving an image relative to an area image sensor and a motor for driving the plate, the control comprising: means for sensing the position of the dither plate and for producing a position signal indicative of the position of the plate; means for combining the position signal with a position command signal to produce an error signal; means for producing a current signal indicative of the current in the motor; means for differentiating the position signal to produce a velocity signal indicative of the velocity of the plate; and means for summing the error signal, the velocity signal, and the current signal and for producing a drive signal for the motor.

In one embodiment of the invention, a pair of dither plates are mounted for movement on orthogonal axes to provide the "X" and "Y" scan directions. Each of the dither plates is driven by a hollow-core motor which is energized by a signal provided by a motor control. A linear position sensor is used to provide a feedback position signal to the motor control.

A principal advantage of the present invention is that movement of an image relative to an image sensor can be precisely controlled under high-throughput conditions. Control of the dither plate is such that the time required for the plate to reach ±10% of a desired position is less than 1.0 msec for a 3.0 mrad step. This is accomplished through the use of a low-inertia, low-inductance motor and a precise motor control which includes a proximity position sensor to detect the plate position. As a result of the low inertia, fast acceleration of the plate can be obtained without excessive drive torque, and as a result of the low inductance, the motor control can be operated with relatively low power requirements.

Other features and advantages will become apparent with reference to the following Description of the Preferred Embodiment when read in light of the attached drawings.

BRIEF DESCRIPTION OF THE DRAWINGS

FIG. 1 is a perspective view of the image scanner of the present invention;

DESCRIPTION OF THE PREFERRED EMBODIMENT

Figure 2:
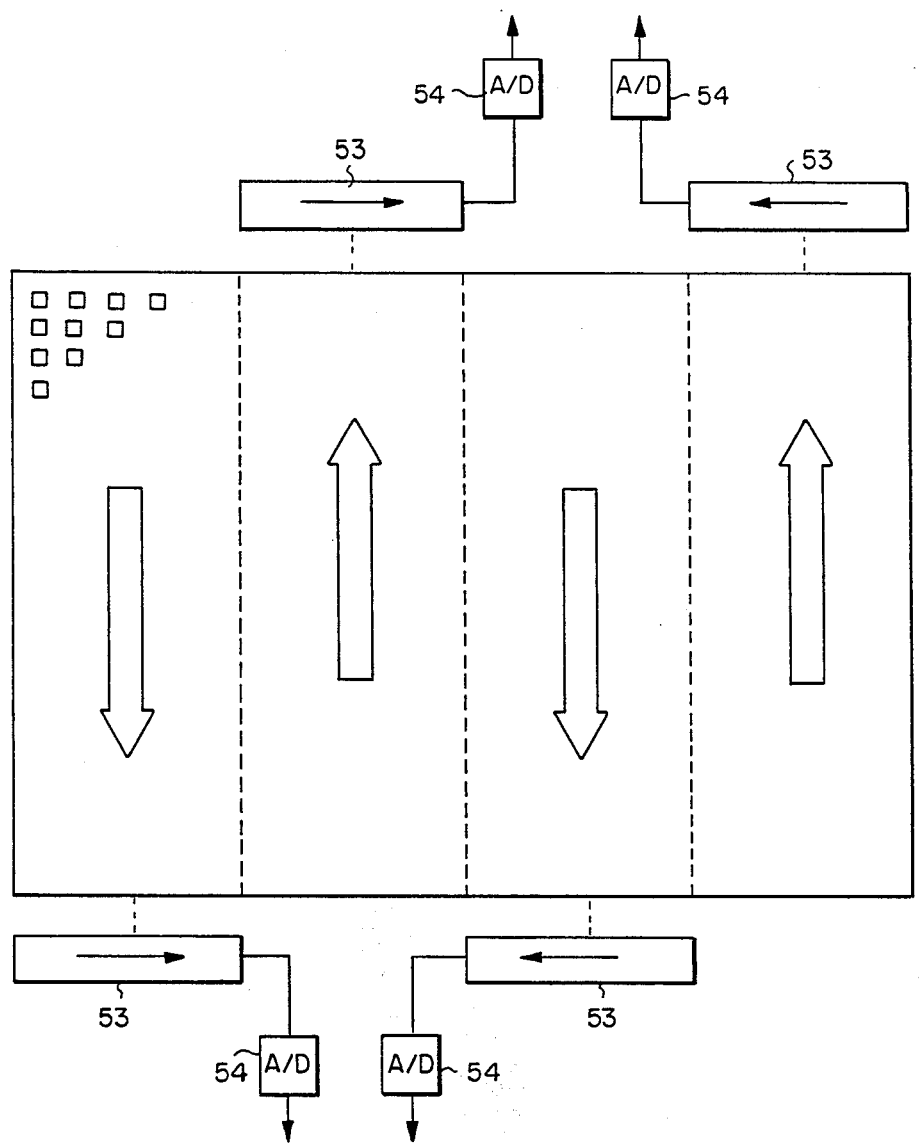
FIG. 2 is a schematic representation of an area image sensor which can be used with the image scanner of FIG. 1.

In FIG. 1, there is shown an image scanner 10 which is constructed in accordance with the present invention. Scanner 10 comprises a circular member 12 which is adapted to hold an element to be scanned, such as a film negative 14. The negative 14 is illuminated by light from a lamp 16, which can be, for example, a 600-watt tungsten lamp. A tapered integrating bar 18 having a fiber optic face 20 is mounted between lamp 16 and negative 14. Light which passes through the negative 14 is collected by an optical means which includes a lens 22 and is focused on the surface of three area image sensors 24, 26, and 28.

Each of the area sensors 24, 26, 28, is identical in construction and is panchromatic. Sensor 24 receives only red colored light, sensor 26 receives only green light, and sensor 28 receives only blue light. Light is distributed to the area sensors 24, 26, and 28 by means of a beam splitter 29 having prisms 29a, 29b, and 29c which direct beams of light through prism trim filters 28a, 24a, and 26a respectively.

Optical elements in the form of an "X" deflector plate, or dither plate, 30, and an "Y" deflector plate, or dither plate, 32 are disposed along the optical axis between lens 22 and the beam splitter 29. Each of the plates 30, 32, can be a glass plate made from optical glass, such as BK 751642, manufactured by Schott Optical Glass, Inc. Each plate 30, 32, has two parallel, optically flat surfaces. When plate 30 is rotated, the image is moved across the surface of each of the area sensors 24, 26, 28, in the X-scan direction, and when plate 32 is rotated, the image is moved across the sensors 24, 26, 28, in the Y-scan direction. An angular rotation of a plate 30, 32, of, for example, 2° corresponds to a translational movement of a light image of approximately 0.002 inches. A more complete description of an image scanner having dither plates can be found in commonly-assigned U.S. Pat. No. 4,638,371, issued Jan. 20, 1987, and the disclosure of this patent is expressly incorporated herein by reference. It will be apparent to those skilled in the art that other optical elements, for example, mirrors (not shown) could be used in place in the plates 30, 32.

Dither plate 30 is driven by a D.C. motor 34 which is controlled by a motor control 47, and dither plate 32 is driven by a motor 36 which is controlled by a motor control 46. Position command signals are provided to controls 46 and 47 by a microprocessor 50.

Figure 3:
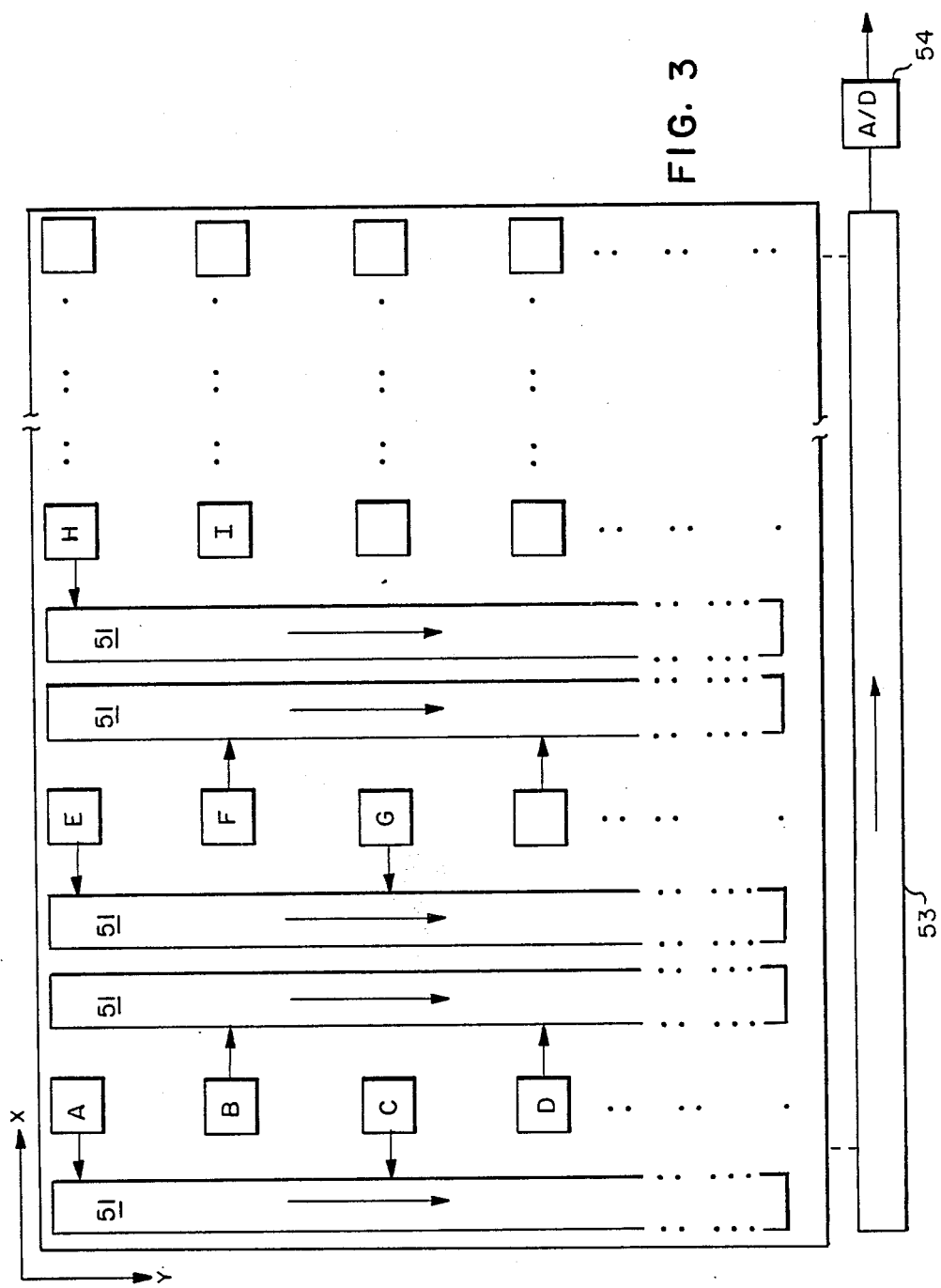
FIG. 3 is another schematic representation of the area image sensor in which the sensor elements are shown in more detail.
Figure 4:
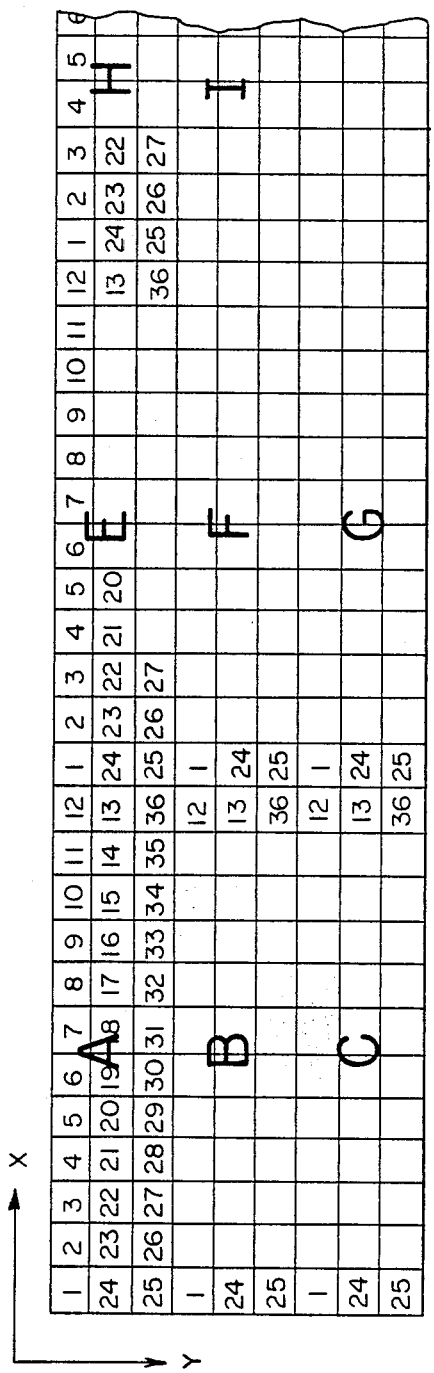
FIG. 4 shows a sampling pattern for the image sensors.

With reference to FIGS. 2 and 3, the image sensor 24 is shown in schematic form. Sensors 24, 26, and 28 are identical, and thus only sensor 24 will be described in detail. Sensor 24 has a sparse array of sensor elements which are identified by the letters A-I in FIG. 3. The elements are arranged in columns, and conventional interline CCD shift registers 51 are place between the columns. Each of the sensor elements samples a portion of the image, starting in the upper left hand corner, as shown in FIG. 4. For example, element A in FIG. 3 samples light image pixel "1" at its position (1,1) of the light image shown in FIG. 4. Each of the other elements B-I will also sample a light image pixel "1" at a respective position (1,1 ).

After each element samples a light image pixel "1" (position 1,1 in FIG. 4), the microprocessor 50 delivers a position command to motor 34 to rotate plate 30 an increment in order to laterally translate the light image in the "X" direction an amount such that each element is now at its light image position (2,1 ) and in a position to sample pixel 2. In a like manner, pixels 3-12 are sampled. When light image pixel 13 is to be sampled, the motor 36 must be energized in which case the light image will be incrementally moved laterally in the "Y" direction. Subsequent incremental energizations of motor 34 will result in the sampling of image pixels 13-24.

After pixel 24 has been sampled, motor 36 must again be energized; pixels 25-36 are then sampled by the incremental energization of motor 34. Each sensor element thus samples thirty-six different light image pixels. As shown in FIG. 4, the light image pixels sampled form a block of 36 pixels organized in a rectangualr 12×3 pattern.

Image sensor 24 can be comprised of a sparse array of either photodiodes or capacitor elements. The photocharge which is accumulated in either a photodiode or a photocapacitor is transferred to an interline CCD shift register 51. In order to reduce the output data rate, four horizontal readout shift registers 53 (FIG. 2) are used to receive the signals from the shift registers 51. The four large arrows shown in FIG. 2 indicate the direction of signal transfer from a sensor to the horizontal shift registers 53, and the smaller arrows indicate the direction of charge transfer through the registers 53. Each shift register 53 is connected to an analog-to-digital converter 54. The signals from converters 54 are processed in a known manner, for example as disclosed in the aforementioned U.S. Pat. No. 4,638,371, and the resulting digital image is stored for subsequent transfer to an output device such as a laser printer.

As noted above, 36 separate dithered positions are required to construct an image. In order to achieve a high throughput in scanner 10, the motor controls 46 and 47 must be capable of effecting the movement of the plates 30, 32, through a 3.0 mrad increment to within ±10% of a desired position in 1.0 msec. In order to achieve the 1.0 msec. step time, a wide bandwidth, on the order of 500 Hz, is required. It is also desirable for the controls 46, 47, to respond linearly to position command inputs over their operating range.

An important element of the present invention is the type of motor used to move plates 30, 32. There is a need to supply torque quickly from a low voltage power amplifier. Applicant has found that hollow-core motors, also known as low-inertia motors and as cup motors, are particularly suitable for use in the present invention. In this type of motor, the armature is wound on a core which is removed after the windings are epoxied. One end of the armature is then attached to the motor shaft. Because the armature is not wound on iron, the resulting inductance is a factor of 10 to 100 below that of a conventional DC motor. One such motor which is suitable for use in the present invention is a Pacific Scientific hollow-core motor, Model No. 2VM61-000-2.

As will be explained in more detail below, feedback of the velocity of plates 30, 32, is required to attain the desired system performance. It was found, however, that the use of a standard tachometer created resonance problems and unwanted inertia in the system. Thus, the position of each of the plates 30, 32, is sensed, and the position signal is differentiated in the frequency range of interest to obtain the velocity signal. Position sensors 62, 64, are mounted, as shown in FIG. 1, to sense the positions of dither plates 30, 32. Sensors 62, 64, must be very sensitive, since the rotation of a plate 30, 32, for each step, or increment, is only 3.0 mrad. For such a small step, a sensor such as an optical encoder is difficult to use, since the encoder must have an extremely high resolution. The total angular movement of the dither plate 30 does not exceed 0.040 radians, and the linear position approximates the angular position. Thus, Applicant has found that a linear position sensor can be used with negligible error.

Sensor 62 comprises a position flag or vane 67, which is mounted on shaft 65, and a detector 68 which senses the linear position of the plate 30. Flag 67 is mounted on the front part of shaft 65 between motor 34 and plate 30 to avoid resonance problems which occur when the flag is mounted on the rear part of shaft 65 (not shown) of motor 34. Flag 67 can also be mounted on plate 30. The sensor 62 provides a voltage which varies linearly with distance from the detector 68 to the flag 67 over a range of, for example, 40 mils. Sensor 62 can be any type of non-contact sensor as long as the inertia it adds to the motor is low. One sensor which is suitable for use with the present invention is a linear proximity sensor, model KD 4152, obtainable from Kaman Corp. A linear optical sensor (not shown) could also be used. Sensor 64 comprises a vane 69 and a detector 70, and it functions in a manner identical to that of sensor 62 to sense the position "Y" dither plate 32.

Figure 5:
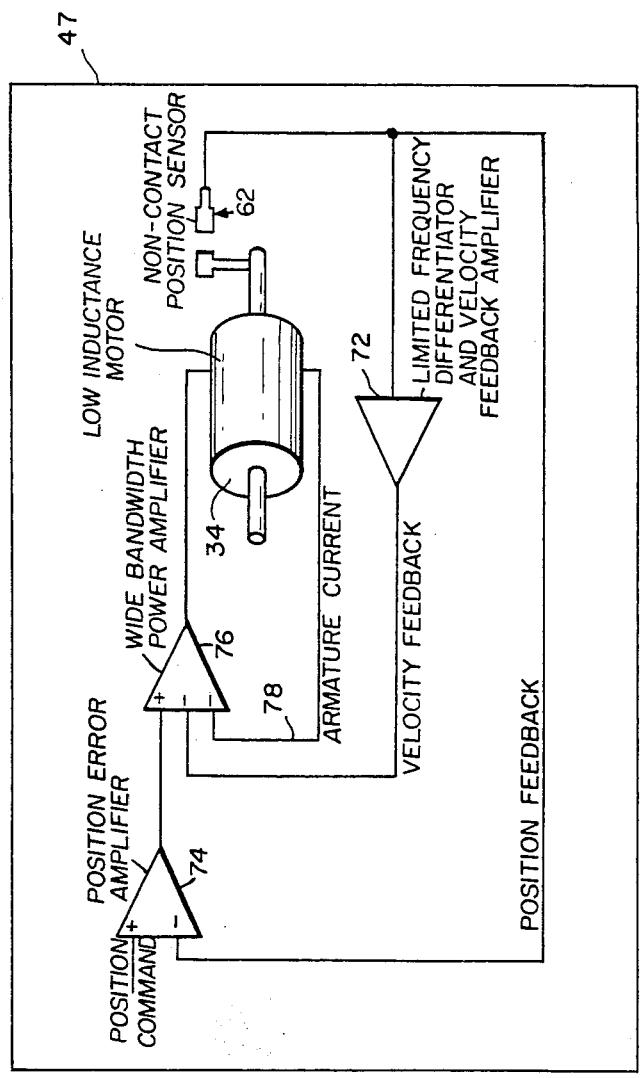
FIG. 5 is a block diagram of the controller for the motor which positions the dither plates.

With reference to FIG. 5, there is shown a block diagram of motor control 47 for precisely controlling the position of "X" dither plate 30. The motor control 46 for controlling the position of "Y" dither plate 32 is identical to control 47. As shown in FIG. 5, a signal from position sensor 62 is fed to a limited frequency differentiator and velocity feedback amplifier 72 and to a position error amplifier 74. It is important that the frequency of the amplifier 72 be limited to minimize noise. If a noise signal is present in the system at some frequency $\omega$, it will look like a sine wave at that frequency: $N(t) = \sin \omega t$. When the noise signal is fed through a differentiator, the output will be:

$$(dN(t)/(dt) = \omega \cos \omega t$$

Thus, the amplitude has scaled up by a factor of $\omega$. If $\omega$ is large, so is the differentiator ouput.

Amplifier 74 also receives a position command signal from microprocessor 50. The output from amplifier 74 is provided to the input of a wide bandwidth power amplifier 76 which also receives a velocity input from amplifier 72 and a signal representing armature current on line 78. The bandwidth of amplifier 76 must be wide enough so that it is not a factor in the system response. One amplifer which has been found suitable is a Torque Systems amplifier, model PA122, which has a 20 kHz full power bandwidth. The output from amplifier 76 drives motor 34 to precisely position the plate 30.

The invention has been described in detail with particular reference to certain preferred embodiments thereof, but it will be understood that variations and modifications can be effected within the spirit and scope of the invention.

I claim:

1. Image scanner for scanning an image across the surface of an area image sensor having a plurality of spaced sensor elements, said scanner comprising:
    a generally planar plate arranged along an optical path and formed of a material for refracting light received along said path from an original;
    a motor attached to said plate for selectively rotating said plate about an axis to displace the image across the sensor surface and thereby cause each of the sensor elements to sense a plurality of image pixels;
    linear sensing means for sensing the position of said plate and for producing a signal indicative of said position; and
    control means for receiving said signal and for producing a drive signal to said motor.

2. Image scanner, as defined in claim 1, wherein said sensor comprises a second plate arranged to move said image in a second direction orthogonal to said direction.

3. Image scanner, as defined in claim 1, wherein said motor is a hollow-core motor.

4. Image scanner, as defined in claim 1, wherein said control means comprises a closed loop feedback arrangement.

5. Image scanner, as defined in claim 1, wherein said plate is fixed to a shaft of said motor, and said sensing means includes a position flag operatively connected to said shaft.

6. Image scanner for scanning an image across an area image sensor, said scanner comprising:
    a dither plate arranged along an optical axis;
    a hollow-core motor for driving said plate, said motor having a shaft connected to said plate;
    a sensor for sensing the position of said plate;
    means for producing a signal representative of motor current;
    means connected to said sensor for producing a signal representative of the velocity of said plate;
    means for producing a position command signal; and
    means for summing said signals and for producing a drive signal for said motor.

7. Image scanner, as defined in claim 6, wherein said sensor is a linear proximity sensor which includes a position indicator operatively connected to said motor shaft, and a detector which produces a voltage which varies linearly with the distance of said indicator from said detector.

8. Image scanner, as defined in claim 6, wherein said means for producing a signal representative of said velocity includes a differentiator which receives the voltage from said detector.

9. A motor control for an image scanner, said scanner having a dither plate for moving an image relative to an area image sensor and a motor for driving said plate, said control comprising:
    means for sensing the position of the dither plate and for producing a position signal indicative of the position of the plate;
    means for combining said position signal with a position command signal to produce an error signal;
    means for producing a current signal indicative of the current in the motor;
    means for differentiating the position signal to produce a velocity signal indicative of the velocity of the plate; and
    means for summing said error signal, said velocity signal, and said current signal and for producing a drive signal for the motor.

10. A control, as defined in claim 9, wherein said summing means responds linearly to said error, velocity, and current signals over its operating range.

11. Image scanner for scanning an image of an object across the surface of an area image sensor having a plurality of spaced sensor elements, said scanner comprising a light source for directing a beam along an optical axis, an optical element along said axis for directing the beam onto said sensors, a motor operatively connected to said element for selectively rotating the element about an axis to displace the image across the sensor surface characterized in that said scanner includes linear sensing means for sensing the position of the element and for producing a signal indicative of said position, and control means for receiving said signal and for producing a drive signal to said motor.

12. Image scanner according to claim 11, characterized in that said motor is a hollow-core motor.

* * * * *